(12) United States Patent
Dolan

(10) Patent No.: US 11,483,480 B2
(45) Date of Patent: *Oct. 25, 2022

(54) SIMULATED ROLLING SHUTTER IMAGE DATA

(71) Applicant: Zoox, Inc., Foster City, CA (US)

(72) Inventor: James Graham Dolan, Foster City, CA (US)

(73) Assignee: Zoox, Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/188,917

(22) Filed: Mar. 1, 2021

(65) Prior Publication Data

US 2021/0185209 A1    Jun. 17, 2021

Related U.S. Application Data

(63) Continuation of application No. 16/405,668, filed on May 7, 2019, now Pat. No. 10,939,042.

(51) Int. Cl.
| | | |
|---|---|---|
| *H04N 7/18* | (2006.01) | |
| *H04N 5/232* | (2006.01) | |
| *H04N 5/235* | (2006.01) | |
| *H04N 5/355* | (2011.01) | |

(52) U.S. Cl.
CPC ......... *H04N 5/2329* (2013.01); *H04N 5/2353* (2013.01); *H04N 5/2355* (2013.01); *H04N 5/355* (2013.01)

(58) Field of Classification Search
CPC ...... H04N 7/18; H04N 5/2329; H04N 5/2353; H04N 5/2355; H04N 5/355
USPC .......................................... 348/148, 294, 296
See application file for complete search history.

(56) References Cited

U.S. PATENT DOCUMENTS

| | | | |
|---|---|---|---|
| 8,054,335 B2* | 11/2011 | Deng | H04N 5/3532 348/208.1 |
| 8,358,359 B2 | 1/2013 | Baker et al. | |
| 8,823,813 B2 | 9/2014 | Mantzel et al. | |
| 9,554,048 B2* | 1/2017 | Silverstein | H04N 5/23248 |
| 9,723,239 B2 | 8/2017 | Cho et al. | |
| 10,012,504 B2 | 7/2018 | Roumeliotis et al. | |
| 10,452,926 B2 | 10/2019 | Brueckner et al. | |
| 11,132,586 B2* | 9/2021 | Tran | G06T 5/006 |
| 11,212,459 B2* | 12/2021 | Sheinin | H04N 5/2357 |
| 2010/0309340 A1 | 12/2010 | Border et al. | |
| 2015/0296159 A1 | 10/2015 | Mansoorian et al. | |
| 2018/0188427 A1 | 7/2018 | Brueckner et al. | |

* cited by examiner

*Primary Examiner* — Trang U Tran
(74) *Attorney, Agent, or Firm* — Lee & Hayes, P.C.

(57) ABSTRACT

A system for converting global shutter image data into simulated rolling shutter image data may include a global-to-rolling shutter image converter. The converter may be configured to receive global shutter image data associated with a plurality of global shutter images. The global shutter image data may include dynamic global shutter image data representative of a moving object in the plurality of global shutter images. The converter may also be configured to determine an optical flow field based at least in part on two or more of the plurality of global shutter images and generate the simulated rolling shutter image based at least in part on the optical flow field. The converter may also be configured to generate high dynamic range (HDR) images based at least in part on the optical flow field and the global shutter image data.

20 Claims, 6 Drawing Sheets

SIMULATED ROLLING SHUTTER IMAGE DATA

RELATED APPLICATION

This application is a continuation of and claims priority to U.S. patent application Ser. No. 16/405,668, filed May 7, 2019, titled, "SIMULATED ROLLING SHUTTER IMAGE DATA," the entirety of which is incorporated herein by reference.

BACKGROUND

In contrast to global shutter images, which record an entire scene in a given field of view at exactly the same instant in time, still and video rolling shutter images are generated by rapidly scanning across, either horizontally or vertically, a field of view, such that all parts of a still or video rolling shutter image are not recorded exactly simultaneously. As a result, rolling shutter images may produce distortions in the images, for example, when the image records objects moving rapidly with respect to the rolling shutter imager or when rapidly flashing light is recorded. Thus, a rolling shutter image of a scene, unless corrected, often appears different than a global shutter image of the corresponding scene. As a result, a system designed for using global shutter image data may not be capable of effectively using rolling shutter image data.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
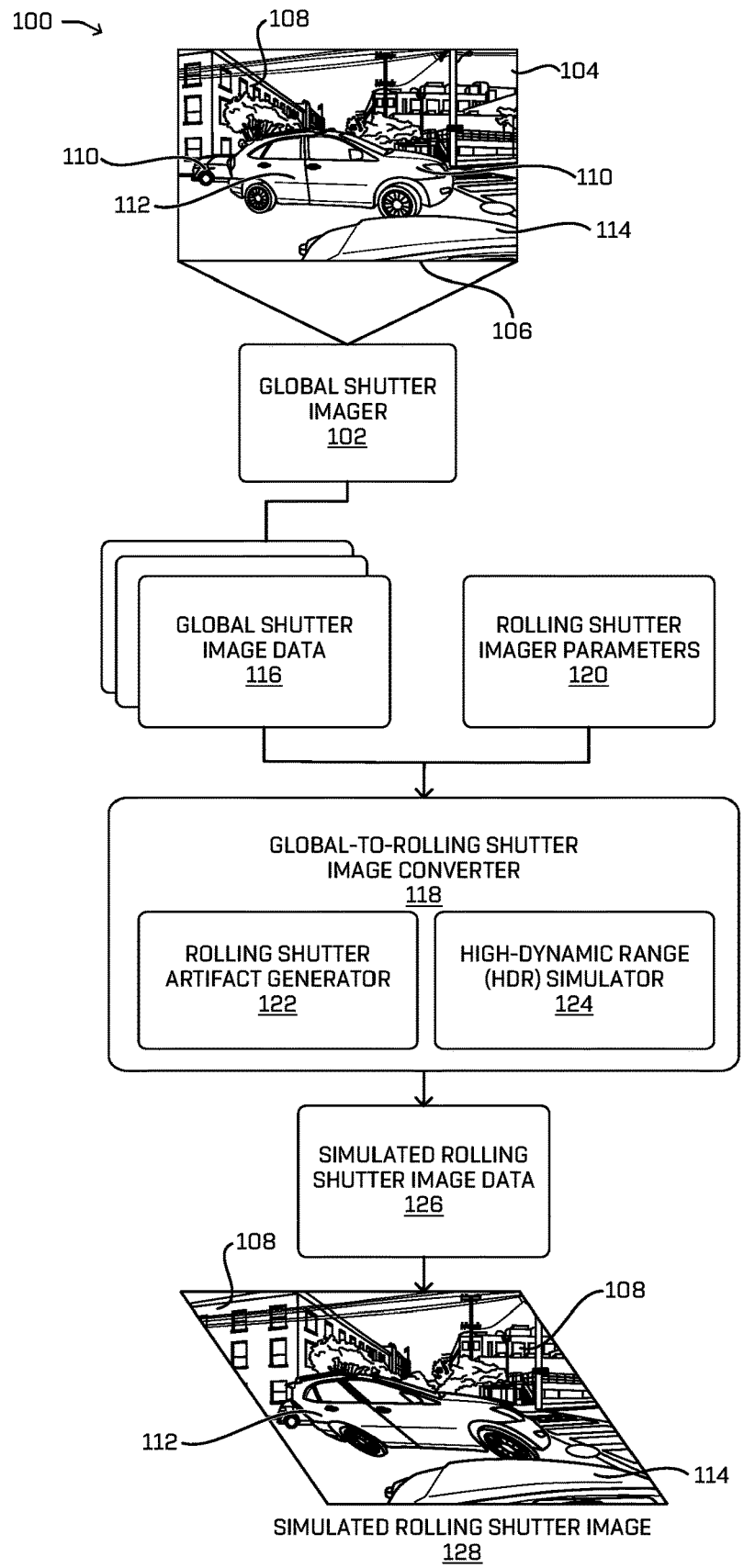
FIG. 1 is a schematic diagram illustrating an example process for converting global shutter image data into simulated rolling shutter image data.

As mentioned above, global shutter images and rolling shutter images differ from one another. Global shutter images of a scene are recorded such that the entire scene is recorded at exactly the same instant, while in contrast, rolling shutter images are generated by rapidly scanning across, either horizontally or vertically, a field of view, such that not all parts of a still or video rolling shutter image are recorded exactly simultaneously. As a result, rolling shutter images may include distortions, or artifacts, in the images, for example, when the image records objects moving rapidly with respect to the rolling shutter imager (either by motion of the object, the imager, or both) or when rapidly flashing light is recorded. This results in differences between images of a scene captured by a global shutter imager and images of the same scene captured by a rolling shutter imager. As a result, a system configured to use or manipulate global shutter image data may not be capable of operating as effectively if provided with rolling shutter image data. For example, a system configured to interpret global shutter image data may not be capable of accurately interpreting rolling shutter image data. As a non-limiting example, an autonomous vehicle having a control system configured for use with global shutter imagers may not be capable of effectively using rolling shutter images or rolling shutter image data to assist with navigation and/or control of the autonomous vehicle. As a result, it may be desirable to convert global shutter image data to rolling shutter image data.

For example, machine learning models may be used to assist control of an autonomous vehicle in part by interpreting data representative of the surrounding environment received from sensors, such as imagers and other sensors. Such machine learning models may be trained using training data representative of sensed objects, including simulated and/or actual images. Due to differences between global shutter image data and rolling shutter image data, a machine learning model trained using global shutter image data may not be able to accurately interpret rolling shutter image data, for example, if imagers coupled to the autonomous vehicle are rolling shutter imagers. In addition, global shutter image data captured in a geographic area and stored as virtual maps may not be useful for training or assisting a machine learning model that is configured to interpret rolling shutter image data. Thus, it may be desirable to convert such global shutter image data into simulated rolling shutter image data, so that a machine learning model trained to interpret rolling shutter image data is able to use the converted global shutter image data.

This disclosure is generally directed to apparatuses, systems, and methods for converting global shutter image data into simulated rolling shutter image data. The global shutter image data may be actual global shutter image data recorded by a global shutter imager or simulated global shutter image data, for example, generated by a computer. For example, a simulation may be created in a simulated environment, and global shutter images may be generated based on a simulated sensor. The global shutter image data may be stored global shutter image data (e.g., stored in a database) and/or global shutter image data recorded real-time by a global shutter imager. In some examples, the conversion to simulated rolling shutter image data may include determining rolling shutter artifacts and generating simulated rolling shutter image data based at least in part on the rolling shutter artifacts, as explained herein. The simulated rolling shutter image data may, in some examples, be used to train a machine learning model to interpret rolling shutter image data. For example, existing global shutter data, which may include annotated ground truth detections, segmentations, classifications, etc., may be used to generate corresponding simulated rolling shutter image data, which may be used to train and/or retrain a machine learning model to interpret actual or simulated rolling shutter image data. In some examples, the annotated ground truth detections, segmentations, classifications, etc., may be distorted, for example, when included in the simulated rolling shutter image data. In some such examples, the machine learning model may be used to assist with navigation and/or control of an autonomous vehicle, for example, as described herein. Other uses for the simulated rolling shutter image data are contemplated.

This disclosure is generally directed to a system for converting global shutter image data into simulated rolling shutter image data. In some examples, the system may include a global-to-rolling shutter image converter configured to receive global shutter image data associated with a plurality of global shutter images. The global shutter image data may include dynamic global shutter image data representative of a moving object in the plurality of global shutter images. The global-to-rolling shutter image converter may also be configured to associate an optical flow field with the moving object based at least in part on two or more of the plurality of global shutter images indicative of the motion of the moving object, and determine one or more rolling shutter artifacts based at least in part on the optical flow field. In some examples, associating the optical flow field with the moving object may include calculating optical flow vectors for one or more pixels representative of the moving object. The global-to-rolling shutter image converter may also be configured to generate simulated rolling shutter image data based at least in part on the one or more rolling shutter artifacts and the global shutter image data.

In some examples, the rolling shutter artifact may include one or more of skew, wobble, spatial aliasing, or temporal aliasing. In some examples, the simulated rolling shutter image data may include data indicative of sequential scan lines. In some examples, the simulated rolling shutter image data may include data indicative of at least one of different frame rates, different scan line densities, or different scan orientations (e.g., vertically or horizontally). In some examples, the global-to-rolling shutter image converter may also be configured to associate a timestamp with one or more of the sequential scan lines.

In some examples, the global-to-rolling shutter image converter may also be configured to add one or more high-dynamic range (HDR) artifacts to the simulated rolling shutter image data. In some examples, adding the HDR artifacts may include generating an HDR sequence including two or more (e.g., three) image frames based at least in part on the optical flow field. The HDR sequence, in some examples, may include one or more of a high-brightness image, a medium-brightness image, or a low-brightness image. In some examples, the HDR artifacts may include one or more of ghosting or blur.

In some examples, the global shutter image data may include annotations, and the global-to-rolling shutter image converter may be configured to add at least one of the annotations to the simulated rolling shutter image data. In some examples, annotations may include labels provided by a human to classify data associated with the global shutter image. In some examples, the annotations are not part of the global shutter image but may be used as ground truth for training a machine-learned model. In some examples, the annotations may be generated in the simulated rolling shutter image data, for example, in accordance with the optical flow field.

Some examples of the global-to-rolling shutter image converter may also be configured to receive first global shutter image data associated with a first field of view (e.g., from a first imager and/or from a database storing the global shutter image data), and receive second global shutter image data associated with a second field of view (e.g., from a second imager and/or from a database storing the global shutter image data) at least partially overlapping the first field of view at an overlapping field of view. In some such examples, determining the one or more rolling shutter artifacts may include associating the optical flow field with the moving object based at least in part on the overlapping field of view. This may be beneficial, for example, when an object is at an edge of the first field of view but within the second field of view.

This disclosure is also generally directed to a method, for example, for converting global shutter image data into simulated rolling shutter image data. In some examples, the method may include receiving global shutter image data associated with one or more global shutter images. In some examples, the global shutter image data may include dynamic global shutter image data representative of a moving object in the plurality of global shutter images. The method may also include determining, based at least in part on a first image and, in some examples, a second image of the plurality of global shutter images, an optical flow field associated with the first image. In some examples, the optical flow field may be calculated using, for example, Lucas-Kanade methods, machine-learned models, etc. The method may also include receiving one or more rolling shutter imager parameters. For example, a rolling shutter imager may have technical characteristics related to performance, such as, for example, scanning orientation associated with scan lines (e.g., related to whether the scan lines are horizontally or vertically oriented), the number of scan lines per frame or field of view, the scan rate of the scan lines, scan line density, total exposure time, high-dynamic range (HDR) capability, etc., any combination of which may be inherent to a particular rolling shutter imager and may affect artifacts associated with rolling shutter image data captured by the particular rolling shutter imager and/or simulated rolling shutter image data generated upon conversion of the global shutter image data into simulated rolling shutter image data. The method, in some examples, may also include generating a rolling shutter image based at least in part on the optical flow field and the rolling shutter imager parameters. In at least some examples where the simulated rolling shutter has no corresponding optical flow information (e.g., if there is an object moving to the right in an image, corresponding left pixels may have no optical flow information for generating the respective simulated rolling shutter image), various techniques may be used to provide such information. In such examples, the techniques may comprise, for example, leaving the pixels with no information, using the previous pixel value, in-painting, blending, down-sampling, and the like. Some examples of the method may further include inputting at least a portion of the simulated rolling shutter image data into a machine learning model as training data to train the machine learning model. In some examples, the machine learning model may be used to assist with navigating and/or controlling an autonomous vehicle based at least in part on data received from the machine learning model trained, at least in part, with the simulated rolling shutter image data. Other uses of the simulated rolling shutter image data and/or the machine learning model are contemplated.

The techniques discussed herein may improve a functioning of a computing device in a number of ways. For example, the techniques discussed herein may include converting global shutter image data into rolling shutter image data, which may allow use of existing global shutter image data (e.g., stored in a database), once converted, in systems configured to use rolling shutter image data. For example, existing global shutter storage data may be converted into simulated rolling shutter image data, so that systems (e.g., navigation and/or control systems) configured to use rolling shutter image data may be used, which may reduce a need to modify the existing systems. In some examples, converting the global shutter image data into simulated rolling shutter image data may render global shutter image data capable of use for training machine learning models to interpret rolling shutter image data. In some examples, this may permit the use of rolling shutter imagers in applications that previously used and/or required global shutter imagers, such as for example, navigation and/or control functions for autonomous vehicles. In some instances, this may facilitate the use of less complex and/or expensive imagers for use with autonomous vehicles and/or data gathering for creation of virtual maps. In addition, in some examples, rolling shutter imagers capable of high-dynamic range (HDR) techniques may be used for navigation and/or control of autonomous vehicles, in at least some instances, at lower cost than global shutter imagers having HDR capability. In addition, the conversion of global shutter image data into rolling shutter image data may mitigate or overcome a need to re-create existing virtual maps derived from global shutter image data using rolling shutter imagers.

The techniques described herein may be implemented in a number of ways. Example implementations are provided below with reference to the following figures. Although discussed, in some instances, in the context of an autonomous vehicle, the methods, apparatuses, and systems described herein can be applied to a variety of systems (e.g., a robotic platform, manually driven vehicles, etc.), and are not limited to autonomous vehicles. For example, the techniques may be used in an aviation and/or nautical context, and/or in any system using machine vision. Additionally, the techniques described herein may be used with real data (e.g., captured using sensor(s)), simulated data (e.g., generated by a computer and/or simulator), or any combination thereof.

FIG. 1 is a schematic diagram illustrating an example process 100 for converting global shutter image data into rolling shutter image data. As shown in FIG. 1, a global shutter imager 102 may be used to record a scene 104 in a field of view 106. The example scene 104 in FIG. 1 includes stationary objects 108 in the background (objects stationary with respect to the surroundings), such as, for example, buildings, telephone poles, trees, the road surface, etc. The stationary objects 108 may be moving with respect to the global shutter imager 102, for example, if the global shutter imager 102 is moving relative to the surroundings. The example scene 104 shown in FIG. 1 also includes dynamic objects 110 that are moving relative to the surroundings and relative to the global shutter imager 102. For example, in the foreground of the field of view 106, a vehicle 112 is passing from left-to-right in front of the global shutter imager 102. Depending on the speed of the vehicle 112 and/or the shutter speed of the global shutter imager 102 when recording the scene 104, the vehicle 112 may be recorded substantially without distortion. For example, the global shutter imager 102 may be configured to record still and/or video images, such that the entire scene 104 is recorded at exactly the same instant in time. In the example shown in FIG. 1, the global shutter imager 102 is mounted on a vehicle 114. (FIG. 1 depicts only a small section of a surface of the vehicle 114.)

As depicted in FIG. 1, the global shutter imager 102 may be configured to generate and/or record global shutter image data 116, for example, according to known global shutter imaging techniques. Although the example process 100 shown in FIG. 1 includes the global shutter imager 102 recording global shutter image data 116 in real-time, global shutter image data 116 may be previously stored global shutter image data that has been previously recorded by a global shutter imager and/or that has been generated by a computer, for example, such that the global shutter image data is simulated global shutter image data. For example, the global shutter image data 116 may include data generated during a mapping operation, for example, where one or more global shutter imagers have been transported through the environment capturing global shutter image data representative of objects in the environment, which may be stored in a database including data, for example, in the form of one or more virtual maps. In some examples, the global shutter image data 116 may be derived from other data sources.

As shown in FIG. 1, the example process 100 may include communicating the global shutter image data 116 to a global-to-rolling shutter image converter 118 configured to receive (and/or access) the global shutter image data 116 and, in some examples, receive rolling shutter imager parameters 120 indicative of parameters related to a rolling shutter imager, the output of which is being simulated. For example, a rolling shutter imager may have technical characteristics related to performance, such as, for example, scanning orientation associated with scan lines (e.g., related to whether the scan lines are horizontally or vertically oriented), the number of scan lines per frame or field of view, the scan rate of the scan lines, scan line density, high-dynamic range (HDR) capability, etc., any combination thereof. Such characteristics may be inherent to a particular rolling shutter imager and may affect artifacts associated with rolling shutter image data captured by the particular rolling shutter imager and/or present in simulated rolling shutter image data generated by the global-to-rolling shutter image converter 118 upon conversion of the global shutter image data 116 into simulated rolling shutter image data.

As shown in FIG. 1, the global-to-rolling shutter image converter 118 may include a rolling shutter artifact generator 122 configured to determine one or more rolling shutter artifacts based at least in part on the global shutter image data 116 and/or the rolling shutter imager parameters 120, for example, as explained in more detail herein. In some examples, the global-to-rolling shutter image converter 118 may include a high-dynamic range (HDR) simulator 124 configured to generate one or more simulated high-dynamic range (HDR) images, each having a different tone mapping, and thereafter combine the HDR images into a composite HDR image (e.g., an average image based on the HDR images). This may be based at least in part on the global shutter image data 116, the rolling shutter imager parameters 120, and/or an optical flow field, for example, as explained in more detail herein. In some examples, the global-to-rolling shutter image converter 118 may be configured to generate simulated rolling shutter image data 126 based at least in part on the one or more rolling shutter artifacts generated by the rolling shutter artifact generator 122, the one or more HDR images generated by the HDR simulator 124, and/or the global shutter image data. In some examples, the simulated rolling shutter image data 126 may be used to generate simulated rolling shutter image 128, which may be stored in memory in a database, processed, reproduced, and/or displayed on a display device.

As shown in FIG. 1, the simulated rolling shutter image 128, in some examples, may be characterized by one or more rolling shutter artifacts (e.g., at least one of skew, wobble, spatial aliasing, or temporal aliasing), and/or one or more HDR simulations (e.g., including at least one of ghosting or blur), as explained in more detail herein. For example, as schematically depicted in FIG. 1, the vehicle 112, passing from left-to-right in the field of view 106 is distorted (e.g., skewed) because the vehicle 112 is moving relative to the imager (e.g., a simulated rolling shutter imager based at least in part on global shutter imager 102 and/or the rolling shutter imager parameters 120), and the simulated rolling shutter image data 126 simulates the fact that the rolling shutter imager captures multiple images in the form of scan lines over a period of time, in contrast to capturing the entire image at exactly the same time, which is characteristic of the global shutter image data 116, from which the simulated rolling shutter image data 126 is simulated. In addition, the schematically-depicted boundaries (frame) of the simulated rolling shutter image 128 is a parallelogram rather than a rectangle to simulate the scan-line characteristic of the rolling shutter image data 126. In the example depicted in FIG. 1, the global shutter imager 102 is not moving relative to the stationary objects 108 in the background of the image. As a result, the stationary objects 108 are substantially not distorted in the simulated rolling shutter image data 126 or the simulated rolling shutter image 128. However, in some examples, if the stationary objects 108 in the background were moving relative to the global shutter imager 102 (e.g., if the vehicle 114 to which the global shutter imager 102 is mounted were moving relative to the background with sufficient speed), the stationary objects 108 would, in some examples, be distorted in the simulated rolling shutter image data 126 and/or the simulated rolling shutter image 128 relative to the global shutter image data 116 and/or images generated by the global shutter image data 116.

Figure 2:
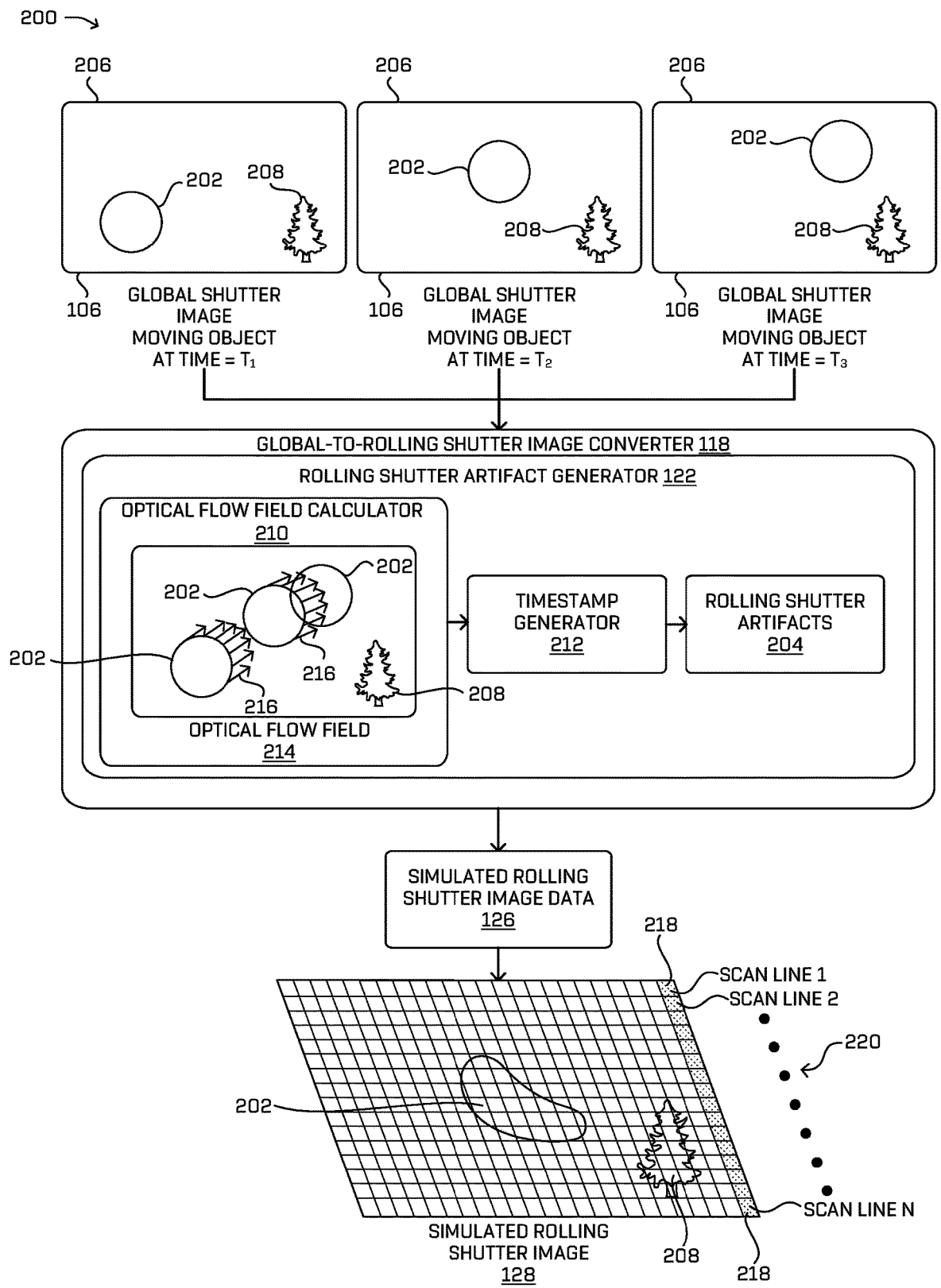
FIG. 2 is a block diagram of an example process for converting global shutter image data associated with an example moving object to example simulated rolling shutter image data, including example generation of rolling shutter artifacts.

FIG. 2 is a block diagram of an example process 200 for converting global shutter image data 116 associated with an example moving object 202 to example simulated rolling shutter image data 126 and an example simulated rolling shutter image 128, including example generation of rolling shutter artifacts 204. As shown in FIG. 2 a sequence of three global shutter images 206 captured at a sequence of times, $T_1$, $T_2$, and $T_3$, schematically depicts a moving object 202 in the form of a ball passing through an example field of view 106 (see FIG. 1) of the global shutter images 206. In the example shown, for the purpose of explanation, the global shutter imager used to capture the global shutter images 206 is stationary, but the moving object 202 could be stationary, and the global shutter imager could be moving relative to the stationary moving object 202 (e.g., the global shutter imager is mounted on a moving vehicle, and the moving object 202 is a stationary object, such as a tree or building), and/or both the global shutter imager and the moving object 202 could be moving relative to one another (e.g., the global shutter imager is mounted on a moving vehicle, and the moving object 202 is another moving vehicle). As shown, the moving object 202, in the lower left of the field of view 106 at time=$T_1$, moves upward and to the right at time=$T_2$, and slightly further up and to the right at time=$T_3$. In the example shown, each of the global shutter images 206 also includes a stationary object 208 in the form of an example tree. As seen in the global shutter images 206, the stationary object 208 does not move relative to the example field of view 106.

In the example process 200 shown in FIG. 2, the global shutter image data from the global shutter images 206 may be communicated to the example global-to-rolling shutter image converter 118 to convert the global shutter image data associated with the global shutter images 206 into simulated rolling shutter image data 126 and/or simulated rolling shutter images 128. In the example shown, the global-to-rolling shutter image converter 118 includes a rolling shutter artifact generator 122, including an optical flow field calculator 210 and a timestamp generator 212 configured to generate rolling shutter artifacts 204 based at least in part on the global shutter image data associated with the global shutter images 206. In some examples, the optical flow field calculator 210 may be configured to receive the global shutter image data associated with two or more global shutter images and calculate an optical flow field 214 associated therebetween. For example, based on one of more of the global shutter images 206 at time=$T_1$, $T_2$, $T_3$, through $T_N$, the optical flow field calculator 210 may be configured to calculate optical flow vectors 216 for one or more pixels from the global shutter image data. As indicated in the figures, because the moving object 202 is the only moving object in the scene, the only optical flow vectors of the scene may be related to the moving object 202 (while every other pixel of the global shutter image 206 is a vector of length zero). Based at least in part on the optical flow vectors 216, the rolling shutter artifact generator 122 may be configured to generate one or more rolling shutter artifacts 204. As schematically depicted in FIG. 2, in some examples, because the stationary object 208 has not moved in the sequence of global shutter images 206 relative to the global shutter imager, there is no optical flow field associated with the stationary object 208.

The example global-to-rolling shutter image converter 118 shown in FIG. 2 also includes the example timestamp generator 212 configured to associate a timestamp 218 with one or more of sequential scan lines 220 of the simulated rolling shutter image data 126. For example, the rolling shutter artifact generator 122 may simulate scan lines 220 (e.g., scan line 1, scan line 2, through scan line N), which may typically be characteristic of rolling shutter image data and add respective timestamps 218 (shown shaded) to one or more of the scan lines 220. For example, as shown in FIG. 2, a timestamp 218 has been added to the end of each of the scan lines 220. The addition of timestamps 218 to other positions in the scan lines 220 is contemplated.

The timestamps 218 may be used to project forward in time where optical flow vectors 216 of the optical flow field 214 would locate information associated with a particular pixel (or group of pixels). For example, the global-to-rolling shutter image converter 118 may be configured to associate a plurality of timestamps 218 with a plurality of scan lines 220 of the rolling shutter image 128 and determine, based at least in part on a first timestamp of the plurality of timestamps 218 and the optical flow field 214, a first pixel value of a first image of the plurality of global shutter images 206. In some examples, the global-to-rolling shutter image converter 118 may be configured assign a second pixel of the rolling shutter image 128 a second pixel value, based at least in part on the first pixel value. This may be repeated for each pixel (or each of a plurality of groups of pixels). In this example manner, the timestamps 218 may be used to project forward in time where optical flow vectors 216 of the optical flow field 214 would locate information associated with the pixels (and/or groups of pixels) of the simulated rolling shutter image 128. A similar technique may be performed in the reverse direction. That is to say that optical flow may be calculated from the second image in a sequence to the first. Based on scanline timestamps and the difference in time between the two global shutter images, a pixel of the simulated rolling shutter image may be traced back along a portion of the associated optical flow vector to a position in the first global shutter image to determine a pixel value.

In some examples, the timestamps 218 may be used for associating a time with the scan lines 220 of the simulated rolling shutter image data 126, which may be useful for additional image data processing processes and/or or for synchronizing the simulated rolling shutter image data 126 with other time-dependent operations associated with the simulated rolling shutter image data 126, such as, for example, fusing of data obtained from other sensors (e.g., other imagers, light detection and ranging (LIDAR) sensors, radio detection and ranging (RADAR) sensors, or sound navigation and ranging (SONAR) sensors). For example, the timestamps 218 may be used for fusing data obtained from one or more global shutter imagers and/or one or more rolling shutter imagers. For example, when a moving object is located at an edge of the field of view of a first global image, and a second sensor (e.g., another imager, either a global or a rolling shutter imager) has an overlapping field of view, data from the second imager may be used in calculations related to the moving object. For example, the global-to-rolling shutter image converter 118, in some examples, may be configured to receive first global shutter image data associated with a first field of view (e.g., from a first global shutter imager and/or from a database), and receive second global shutter image data associated with a second field of view (e.g., from a second global shutter imager and/or from a database) at least partially overlapping the first field of view at an overlapping field of view. In some examples, the global-to-rolling shutter image converter 118 may be configured to determine one or more rolling shutter artifacts associated with the moving object, for example, by associating the optical flow field based at least in part on global shutter image data from the overlapping field of view.

As schematically shown in FIG. 2, the moving object 202 from the global shutter images 206 (e.g., the ball) is distorted in the simulated rolling shutter image 128. Instead of being depicted as spherical, it is depicted as being substantially elliptical in cross-section, which results from the rolling shutter artifacts 204 (e.g., skew), which may be characteristic of a moving object captured by a rolling shutter imager. Other rolling shutter artifacts are contemplated.

Figure 3:
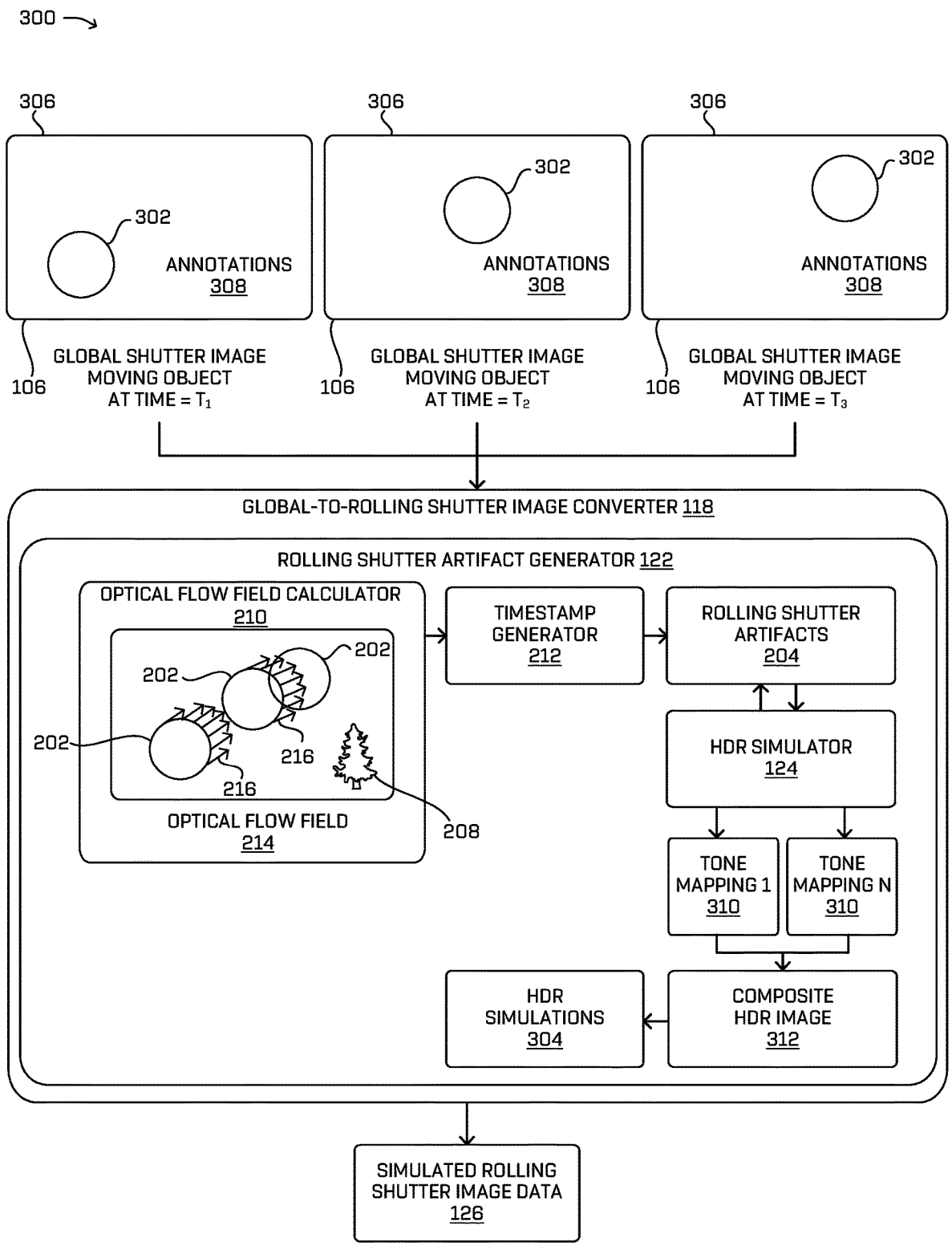
FIG. 3 is a block diagram of an example process for converting global shutter image data associated with an example moving object to an example simulated rolling shutter image including, an example generation of a high-dynamic range (HDR) simulation.

FIG. 3 is a block diagram of an example process 300 for converting global shutter image data 116 associated with an example moving object 302 to example simulated rolling shutter image data 126 and an example simulated rolling shutter image 128, including example generation of high-dynamic range (HDR) simulations 304. In some examples, the example process 300 may be incorporated as a part of a process generating rolling shutter artifacts (e.g., process 200 shown in FIG. 2), either as an integral process or separate process. As shown in FIG. 3 a sequence of three global shutter images 306 captured at a sequence of times, $T_1$, $T_2$, and $T_3$, schematically depicts a moving object 302 in the form of a ball passing through an example field of view 106 of the global shutter images 306. In the example shown, for the purpose of explanation, the global shutter imager used to capture the global shutter images 306 is stationary, but the moving object 302 could be stationary, and the global shutter imager could be moving relative to the stationary moving object 302 (e.g., the global shutter imager is mounted on a moving vehicle, and the moving object 302 is a stationary object, such as a tree or building), and/or both the global shutter imager and the moving object 302 could be moving relative to one another (e.g., the global shutter imager is mounted on a moving vehicle, and the moving object 302 is another moving vehicle). As shown, the moving object 302, in the lower left of the field of view at time=$T_1$, moves upward and to the right at time=$T_2$, and slightly further up and to the right at time=$T_3$. In the example shown, each of the global shutter images 306 also includes annotations 308, which may be present in the global shutter image data associated with the global shutter images 306. In some examples, the annotations 308 may be associated with existing global shutter data, which may include annotated ground truth detections, segmentations, classifications, etc. The annotations may be used to generate corresponding simulated rolling shutter image data, which may be used to train and/or retrain a machine learning model to interpret actual or simulated rolling shutter image data. In some examples, the annotated ground truth detections, segmentations, classifications, etc., may be distorted, for example, when included in the simulated rolling shutter image data. As seen in the global shutter images 306, the example annotations 308 shown do not move relative to the example field of view 106. In some examples, the annotations 308 may move relative to the field of view 106, for example, depending on the effect of converting the global shutter image data into simulated rolling shutter image data.

In the example process 300 shown in FIG. 3, the global shutter image data from the global shutter images 306 may be communicated to the example global-to-rolling shutter image converter 118 to convert the global shutter image data associated with the global shutter images 306 into simulated rolling shutter image data 126 and/or simulated rolling shutter images 128 (see FIGS. 1 and 2). In the example shown, the global-to-rolling shutter image converter 118 includes an HDR simulator 124, including an optical flow field calculator 210 and a timestamp generator 212 configured to generate HDR simulations 304 based at least in part on the global shutter image data associated with the global shutter images 306. In some examples, the optical flow field calculator 210 may be configured to receive the global shutter image data associated with two or more global shutter images indicative of a motion of the moving object 302 and calculate an optical flow field 214 associated with the pixels (and/or groups of pixels) therebetween. For example, based on one of more of the global shutter images 306 at time=$T_1$, $T_2$, $T_3$, through $T_N$, the optical flow field calculator 210 may be configured to calculate optical flow vectors 216 for one or more pixels from the global shutter image data. Based at least in part on the optical flow vectors 216, the HDR simulator 124 may be configured to generate one or more HDR images, each having a different tone mapping (e.g., based on exposure time), such as shown in FIG. 3, for example, tone mapping 1 (310) through tone mapping N (310) (e.g., three tone mappings). In some examples, two or more HDR images may be generated for, for example, each scanline, with each HDR image simulating different exposure times, for example, and/or associated with different tone mappings. Thereafter, or concurrently, the HDR simulator 124 may be configured to combine each of the HDR images into a composite HDR image 312, which may be, for example, an image having an average tone mapping based on the multiple HDR images with different tone mappings, and which may take the form of the HDR simulations 304. Due at least in part on the different tone mappings, there may be relatively longer time periods between the scan lines, which may affect the rolling shutter artifacts (e.g., it may render them more pronounced and/or create "ghosting" and/or "blur").

In some examples, the HDR simulator 124 may be configured to generate, based at least in part on the rolling shutter artifacts, the one or more HDR simulations 304. In some examples, generating the HDR simulations 304 may include generating an HDR sequence including two or more (e.g., three) image frames based at least in part on the optical flow field 214. Some rolling shutter imagers may be configured to capture images in according to an HDR technique, which may provide a greater dynamic range of luminosity relative to non-HDR techniques, and the HDR simulator 124 may be configured to generate rolling shutter images including HDR simulations 304, which may take the form of, for example, ghosting and blurring.

Figure 4:
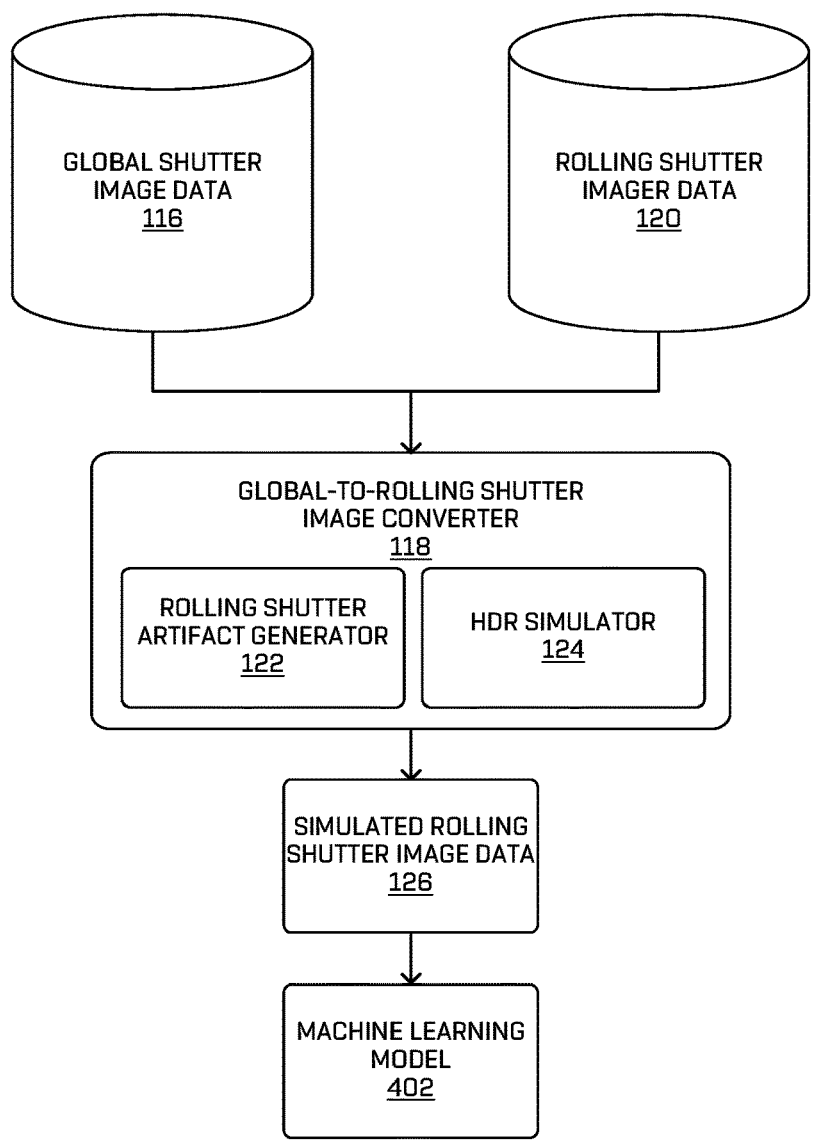
FIG. 4 is a block diagram of an example system for converting global shutter image data to simulated rolling shutter image data for input into a machine learning model as training data.

FIG. 4 is a block diagram of an example system 400 for converting global shutter image data 116 to simulated rolling shutter image data 126 for input into an example machine learning model 402 as training data for training the machine learning model 402. As noted above with respect to FIG. 1, the global shutter image data 116 may be data captured in real-time via a global shutter imager, and/or the global shutter image data 116 may be previously stored global shutter image data that has been previously recorded by one or more global shutter imagers and/or that has been generated by a computer, for example, such that the global shutter image data 116 is simulated global shutter image data. For example, the global shutter image data 116 may include data generated during a mapping operation, for example, where one or more global shutter imagers have been transported through the environment capturing global shutter image data representative of objects in the environment, which may be stored in a database and/or associated with one or more maps. In some examples, the global shutter image data 116 may be derived from other data sources.

As shown in FIG. 4, the system 400 may also include in some examples of rolling shutter imager parameters 120 indicative of parameters related to a rolling shutter imager, the output of which is being simulated, as described previously herein with respect to FIG. 1. For example, a rolling shutter imager may have technical characteristics related to performance, such as, for example, scanning orientation associated with scan lines (e.g., related to whether the scan lines are horizontally or vertically oriented), the number of scan lines per frame or field of view, the scan rate of the scan lines, scan line density, total exposure time, high-dynamic range (HDR) capability, etc., any combination of which may be inherent to a particular rolling shutter imager and may affect artifacts associated with rolling shutter image data captured by the particular rolling shutter imager and/or simulated rolling shutter image data generated by the global-to-rolling shutter image converter 118 upon conversion of the global shutter image data 116 into simulated rolling shutter image data.

The example system 400 may include a global-to-rolling shutter image converter 118 configured to receive (and/or access) the global shutter image data 116 and, in some examples, receive (and/or access) the rolling shutter imager parameters 120. As shown, the global-to-rolling shutter image converter 118 may include a rolling shutter artifact generator 122 configured to determine one or more rolling shutter artifacts based at least in part on the global shutter image data 116 and/or the rolling shutter imager parameters 120, for example, as explained in more detail herein. In some examples, the global-to-rolling shutter image converter 118 may include a high-dynamic range (HDR) simulator 124 configured to determine one or more HDR artifacts based at least in part on the global shutter image data 116 and/or the rolling shutter imager parameters 120, for example, as explained in more detail herein. In some examples, the global-to-rolling shutter image converter 118 may be configured to generate simulated rolling shutter image data 126 based at least in part on the one or more rolling shutter artifacts generated by the rolling shutter artifact generator 122, the one or more HDR artifacts generated by the HDR simulator 124, and/or the global shutter image data 116. In some examples, the simulated rolling shutter image data 126 may be used to generate simulated rolling shutter images 128, which may be stored in memory in a database, processed, reproduced, and/or displayed on a display device.

As shown in FIG. 4, the system 400 may include a machine learning model 402 configured to receive training data including, for example, at least the simulated rolling shutter image data 126. For example, the machine learning model 402 may be in communication with the global-to-rolling shutter image converter 118. The machine learning model 402 may be any analytic model capable of using the simulated rolling shutter image data 126 as training data, such as, for example, a system for assisting with navigation and/or control of a vehicle, such as, for example, a semi-autonomous vehicle and/or a fully autonomous vehicle, as described herein. The machine learning model 402 may be stored in memory and may include any models, algorithms, and/or machine learning algorithms, which may be implemented, for example, as a neural network.

As described herein, an exemplary neural network is a biologically inspired algorithm which passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks, such as, for example, ResNet50, ResNet101, VGG, DenseNet, PointNet, and the like.

Figure 5:
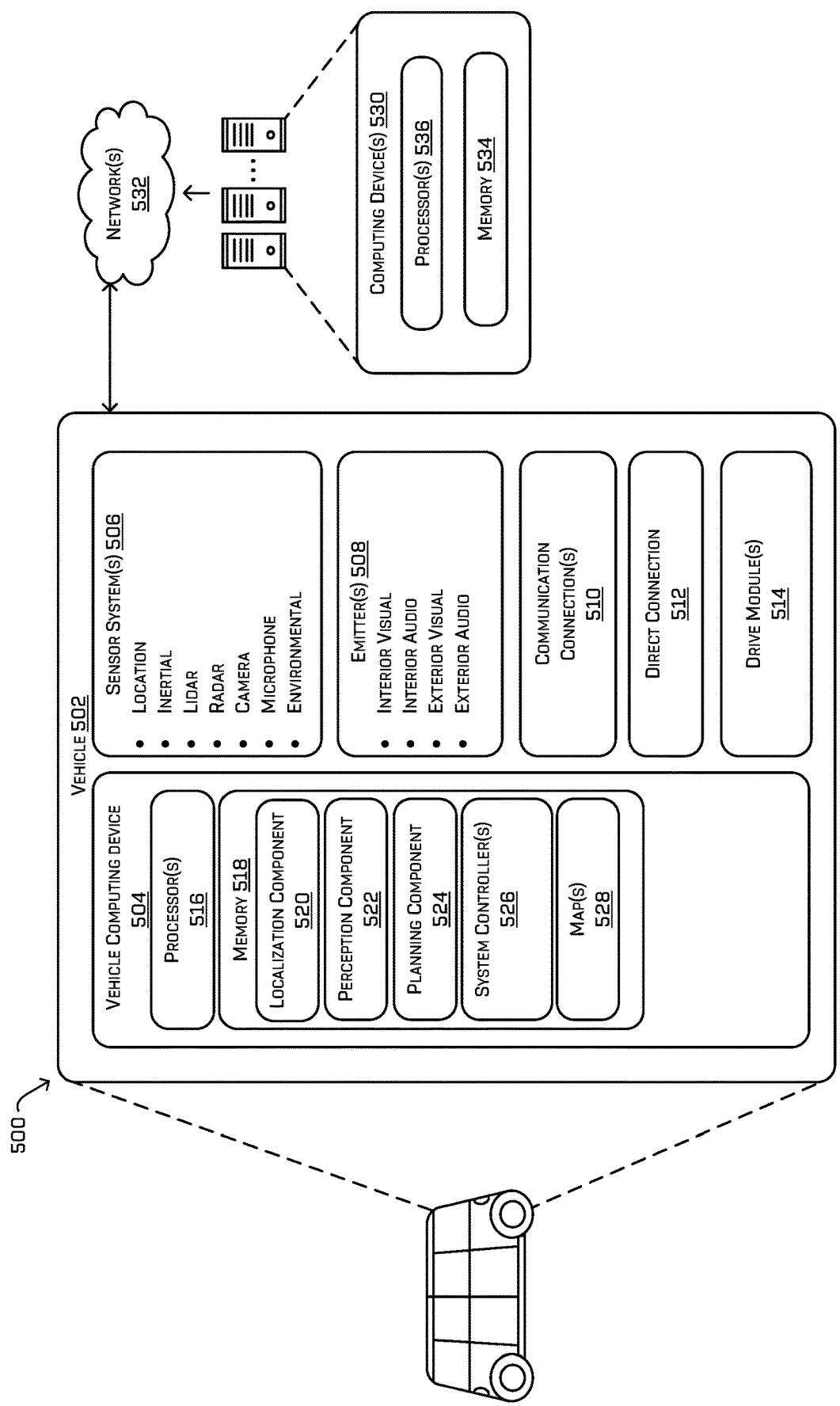
FIG. 5 is an example vehicle systems architecture for an example autonomous vehicle for implementing techniques described herein.

FIG. 5 is an example vehicle systems architecture 500 for an example vehicle 502 (e.g., a partially or fully autonomous vehicle) for implementing techniques described herein. For example, the simulated rolling shutter image data 126 may be used to train a machine learning model (e.g., the machine learning model 402 shown and described with respect to FIG. 4), which may be used to assist with navigation and/or control of the example vehicle 502.

The vehicle 502 may include a vehicle computing device 504, one or more sensor systems 506, one or more emitters 508, one or more communication connections 510, at least one direct connection 512, and one or more drive module(s) 514. The vehicle computing device 504 may include one or more processors 516 and memory 518 communicatively coupled with the one or more processors 516. In the illustrated example, the vehicle 502 is an autonomous vehicle. However, the vehicle 502 may be any other type of vehicle. In the illustrated example, the memory 518 of the vehicle computing device 504 stores a localization component 520, a perception component 522, a planning component 524, one or more system controllers 526, and one or more map(s) 528. Though depicted in FIG. 5 as residing in memory 518 for illustrative purposes, it is contemplated that the localization component 520, the perception component 522, the planning component 524, the one or more system controllers 526, and the one or more map(s) 528 may additionally, or alternatively, be accessible to the vehicle 502 (e.g., stored on, or otherwise accessible by, memory remote from the vehicle 502).

In at least one example, the localization component 520 may be configured to receive data from the sensor system(s) 506, for example, including one or more global shutter imagers and/or one or more rolling shutter imagers, to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. For example, the map may include one or more of global shutter image data, rolling shutter image data, and/or simulated rolling shutter image data, for example, as described herein. In some examples, the localization component 520 may utilize SLAM (simultaneous localization and mapping), CLAMS (calibration, localization and mapping, simultaneously), relative SLAM, bundle adjustment, non-linear least squares optimization, or the like to receive image data (e.g., global shutter image data, rolling shutter image data, and/or simulated rolling shutter image data) LIDAR sensor data, radar data, IMU data, GPS data, wheel encoder data, and the like to accurately determine a location of the vehicle 502. In some examples, the localization component 520 may provide data to various components of the vehicle 502 to determine an initial position of an autonomous vehicle for generating a candidate trajectory, as discussed herein.

In some examples, the perception component 522 may be configured to perform object detection, segmentation, and/or classification. In some examples, the perception component 522 may provide processed sensor data (e.g., global shutter image data, rolling shutter image data, and/or simulated rolling shutter image data) that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional and/or alternative examples, the perception component 522 may provide processed sensor data that indicates one or more characteristics associated with a detected entity and/or the environment in which the entity is positioned (e.g., global shutter image data, rolling shutter image data, and/or simulated rolling shutter image data). In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the vehicle 502 from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In at least one example, the planning component 524 may determine a location of a user based on image data of an environment (e.g., global shutter image data, rolling shutter image data, and/or simulated rolling shutter image data) received from the user using, for example, bags of binary words with image-based features, artificial neural network, and the like. Further, the planning component 524 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 502 may stop to pick up a passenger. In at least one example, the planning component 524 may determine a pickup location based at least in part on determining a user identity (e.g., determined via image recognition or received as an indication from a user device, as discussed herein).

In at least one example, the vehicle computing device 504 may include one or more system controllers 526, which may be configured to control steering, propulsion, braking, safety, emitters, communication, and other systems of the vehicle 502. These system controller(s) 526 may communicate with and/or control corresponding systems of the drive module(s) 514 and/or other components of the vehicle 502.

The memory 518 may further include one or more map(s) 528 that may be used by the vehicle 502 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In some examples, a map may include a three-dimensional mesh of the environment. In some examples, the map may be stored in a tiled format, such that individual tiles of the map represent a discrete portion of an environment and may be loaded into working memory as needed. In at least one example, the one or more map(s) 528 may include at least one map (e.g., images and/or a mesh). In some examples, the vehicle 502 may be controlled based at least in part on the map(s) 528. That is, the map(s) 528 may be used in connection with the localization component 520, the perception component 522, and/or the planning component 524 to determine a location of the vehicle 502, identify objects in an environment, and/or generate routes and/or trajectories to navigate within an environment.

In some examples, the one or more map(s) 528 may be stored on a remote computing device(s) (such as computing device(s) 530) accessible via one or more network(s) 532. In some examples, multiple map(s) 528 may be stored based on, for example, a characteristic (e.g., type of entity, time of day, day of week, season of the year, etc.). Storing multiple map(s) 528 may have similar memory requirements but increase the speed at which data in a map may be accessed.

In some examples, aspects of some or all of the components discussed herein may include any models, algorithms, and/or machine learning algorithms. For example, in some examples, the components in the memory 518 and/or the memory 534 may be implemented as a neural network, for example, as described herein with respect to the machine learning model 402 with respect to FIG. 4.

In at least one example, the sensor system(s) 506 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), global shutter imagers, rolling shutter imagers, etc.), microphones, wheel encoders, environment sensors (e.g., temperature sensors, humidity sensors, light sensors, pressure sensors, etc.), etc. The sensor system(s) 506 may include multiple examples of each of these or other types of sensors. For example, the LIDAR sensors may include individual LIDAR sensors located at the corners, front, back, sides, and/or top of the vehicle 502. As another example, the camera sensors may include multiple cameras disposed at various locations about the exterior and/or interior of the vehicle 502. For example, one or more imagers may have at least partially overlapping views, for example, as described herein. The sensor system(s) 506 may provide input to the vehicle computing device 504. Additionally, or alternatively, the sensor system(s) 506 may send sensor data, via the one or more networks 532, to the one or more computing device(s) 530 at a particular frequency, after a lapse of a predetermined period of time, in near real-time, etc.

The vehicle 502 may also include one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 502 may also include one or more communication connection(s) 510 that enable communication between the vehicle 502 and one or more other local or remote computing device(s). For example, the communication connection(s) 510 may facilitate communication with other local computing device(s) on the vehicle 502 and/or the drive module(s) 514. Also, the communication connection(s) 510 may allow the vehicle 502 to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 532. For example, the communications connection(s) 510 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive module(s) 514. In some examples, the vehicle 502 may have a single drive module 514. In at least one example, if the vehicle 502 has multiple drive module(s) 514, individual drive module(s) 514 may be positioned on opposite ends of the vehicle 502 (e.g., the front and the rear, etc.). In at least one example, the drive module(s) 514 may include one or more sensor systems to detect conditions of the drive module(s) 514 and/or the surroundings of the vehicle 502, for example, as described herein. By way of example and not limitation, the sensor system(s) 506 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors (e.g., global shutter imagers and/or rolling shutter imagers), ultrasonic sensors to acoustically detect objects in the surroundings of the drive module, LIDAR sensors, radar sensors, etc. Some sensors, such as the wheel encoders may be unique to the drive module(s) 514. In some cases, the sensor system(s) on the drive module(s) 514 may overlap or supplement corresponding systems of the vehicle 502 (e.g., sensor system(s) 506).

The drive module(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 may include a drive module controller, which may receive and preprocess data from the sensor system(s) 506 and to control operation of the various vehicle systems. In some examples, the drive module controller may include one or more processors and memory communicatively coupled with the one or more processors. The memory may store one or more modules to perform various functionalities of the drive module(s) 514. Furthermore, the drive module(s) 514 also include one or more communication connection(s) that enable communication by the respective drive module with one or more other local or remote computing device(s).

In at least one example, the direct connection 512 may provide a physical interface to couple the one or more drive module(s) 514 with the body of the vehicle 502. For example, the direct connection 512 may allow the transfer of energy, fluids, air, data, etc. between the drive module(s) 514 and the vehicle 502. In some examples, the direct connection 512 may further releasably secure the drive module(s) 514 to the body of the vehicle 502.

In at least one example, the localization component 520, perception component 522, and/or the planning component 524 may process sensor data, as described above, and may send their respective outputs, over the one or more network(s) 532, to one or more computing device(s) 530. In at least one example, the localization component 520, the perception component 522, and/or the planning component 524 may send their respective outputs to the one or more computing device(s) 530 at a particular frequency, after a lapse of a predetermined period of time, in near real-time, etc. In some examples, the vehicle computing device 504 and/or the computing device 530 may include, individually or collectively, the global-to-rolling shutter image converter 118, as described here.

The processor(s) 516 of the vehicle 502 and/or the processor(s) 536 of the computing device(s) 530 may include any suitable processor capable of executing instructions to process data and perform operations as described herein. By way of example and not limitation, the processor(s) 516 and 536 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 534 are examples of non-transitory computer-readable media. The memory 518 and 534 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 530, and/or components of the computing device(s) 530 may be associated with the vehicle 502. That is, the vehicle 502 may perform one or more of the functions associated with the computing device(s) 530, and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures described herein are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures disclosed herein may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures may be transmitted to the architectures via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules is discussed below.

Figure 6:
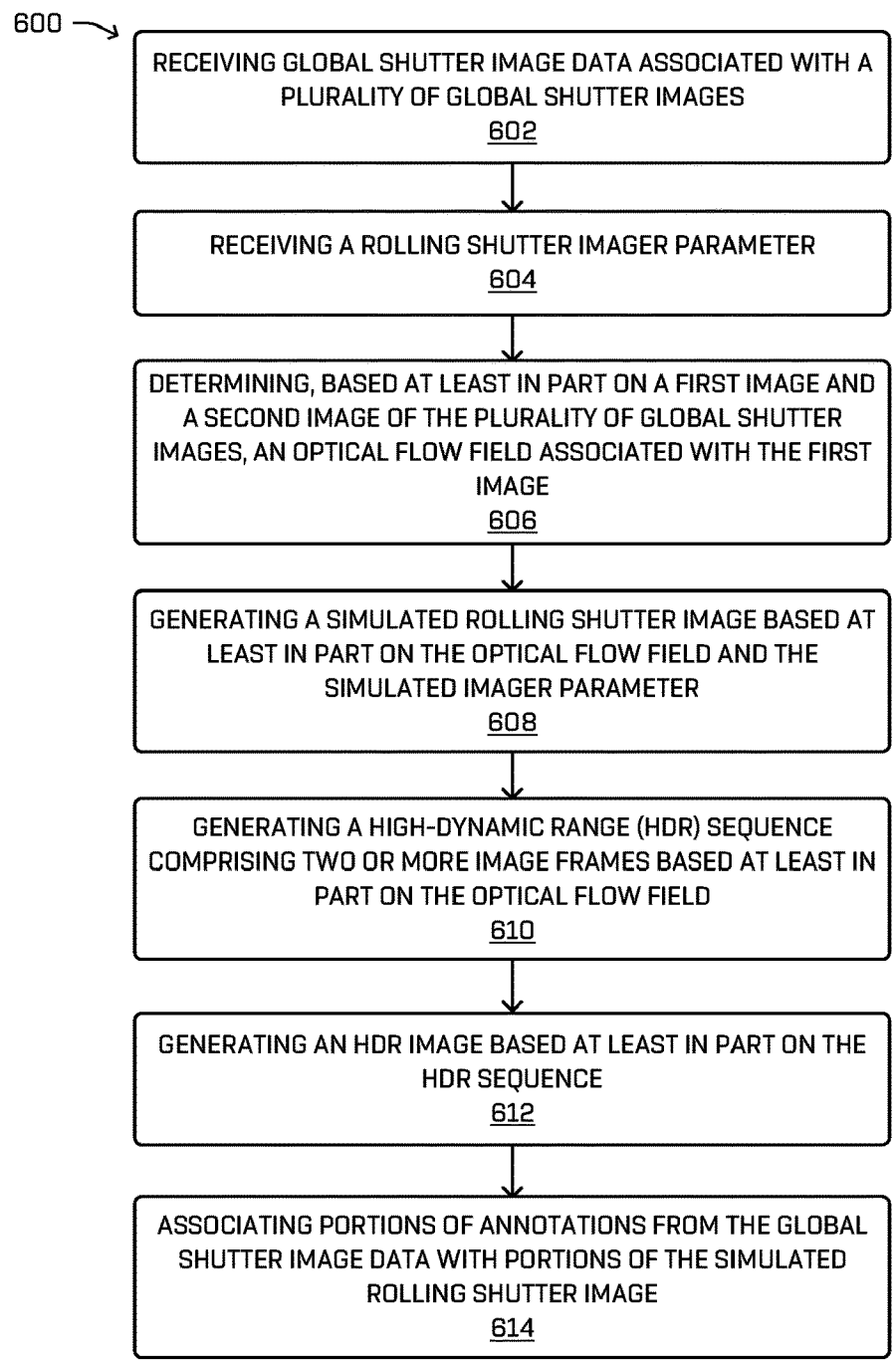
FIG. 6 is a flow diagram of an example process for converting global shutter image data into simulated rolling shutter image data according to techniques described herein.

FIG. 6 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an example process 600 for converting global shutter image data into simulated rolling shutter image data. At 602, the example process 600 may include receiving global shutter image data associated with a plurality of global shutter images. In some examples, the global shutter image data may include dynamic global shutter image data representative of a moving object in the plurality of global shutter images, for example, as described herein. In some examples, the global shutter image data may be received by a global-to-rolling shutter image converter, for example, as described herein.

At 604, the example process 600 may include receiving a rolling shutter imager parameter. For example, the rolling shutter image parameter may include one more parameters related to a rolling shutter imager, the output of which is being simulated. For example, a rolling shutter imager may have technical characteristics related to performance, such as, for example, scanning orientation associated with scan lines (e.g., related to whether the scan lines are horizontally or vertically oriented), the number of scan lines per frame or field of view, the scan rate of the scan lines, scan line density, high-dynamic range (HDR) capability, etc., any combination thereof. Such characteristics may be inherent to a particular rolling shutter imager and may affect artifacts associated with rolling shutter image data captured by the particular rolling shutter imager. In some examples, such parameters may further include imager intrinsics, such as, but not limited to, focal lengths, center points, lens distortion parameters, and the like.

The example process 600, at 606, may include determining, based at least in part on a first image and a second image of the plurality of global shutter images, an optical flow field associated with the first image. For example, the global-to-rolling shutter converter may include an optical flow field calculator, and the optical flow field calculator may be configured to calculate optical flow vectors for one or more pixels representative of the moving object, for example, as described herein. Such vectors may be generated in accordance with, for example, Lucas-Kanade techniques, absolute knowledge of where particular pixel sources moved in a simulation, using deep- and/or machine-learning techniques, and the like. In some examples, the optical flow field may include a set of vectors associated with one or more pixels of the first image, and determining the simulated rolling shutter image associated with the first image and second images may include determining a scan rate for a simulated rolling shutter imager (e.g., based at least in part on the one or more rolling shutter imager parameters), and generating, based at least in part on the scan rate, the set of vectors, and the first image, a simulated rolling shutter image.

At 608, the example process 600 may include generating a simulated rolling shutter image based at least in part on the optical flow field and a simulated imager parameter, which may be based at least in part on the one or more rolling shutter imager parameters. For example, generating the simulated rolling shutter image may include determining a rolling shutter artifact based at least in part on the optical flow field. For example, the global-to-rolling shutter converter may include a rolling shutter artifact generator, and the rolling shutter artifact generator may be configured to determine rolling shutter artifacts based at least in part on the optical flow field, for example, as described herein. For example, this may include associating a plurality of timestamps with a plurality of scan lines of the simulated rolling shutter image. This may include determining, based at least in part on a first timestamp of the plurality of timestamps and the optical flow field, a first pixel value of a first image of the plurality of global shutter images, and assigning a second pixel of the simulated rolling shutter image a second pixel value, based at least in part on the first pixel value. This process may be performed for each pixel or group of pixels associated with the one or more global shutter images. As a non-limiting, illustrative example, consider an instance where the desired rolling shutter image has a frame rate of 10 Hz with 10 scan lines (or, similarly, an example with 100 ms between global shutter images having 10 scan lines at a scan rate of 10 ms/scan line). A pixel in the first row of the first (global shutter) image of such an example may have a corresponding optical flow vector associated therewith. Because the pixel is located in the third scan line, the optical flow vector is scaled by 3/10 (30 ms/100 ms), and a corresponding image location is determined (the pixel position of the first pixel plus the scaled optical flow vector). In such examples where the new pixel location is not an integer, various interpolation techniques (e.g., such as bilinear, bicubic, and/or polynomial interpolation) may be used. A pixel of the rolling shutter image at the new location may thereafter be set with a value of the corresponding pixel of the first global shutter image. A similar process may be performed using the reverse process (e.g., the optical flow from the second image to the first, where the scaled vector is a look-up into the first image based on an interpolation).

The process 600, at 610, may include generating a high-dynamic range (HDR) sequence comprising two or more image frames (e.g., three) having different tone mappings based at least in part on the optical flow field, and thereafter combining the two or more image frames into a composite image frame. In some examples, this may include performing 608 multiple times with different timestamps (e.g., which may be dependent on different exposure times for each HDR image), applying a different tone mapping for each image frame, and thereafter combining the image frames into a composite image frame (e.g., having an average tone mapping).

The example process 600, at 612, may include generating an HDR image based at least in part on the HDR sequence, for example, in the form of a composite image, as described above.

At 614, in some examples, the process 600 may also include associating portions of annotations from the global shutter image data with portions of the simulated rolling shutter image, for example, as described herein.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example system for converting global shutter image data into simulated rolling shutter image data, the system comprising:
a global-to-rolling shutter image converter configured to:
receive global shutter image data associated with a plurality of global shutter images;
determine, based at least in part on a first image and a second image of the plurality of global shutter images, an optical flow field associated with the first image;
receive one or more simulated imager parameters; and
generate a simulated rolling shutter image based at least in part on the optical flow field and the simulated imager parameters.

B. The system of example A, wherein the global-to-rolling shutter image converter is further configured to generate a high-dynamic range (HDR) image, wherein generating the HDR image comprises generating an HDR sequence comprising two or more image frames based at least in part on the optical flow field.

C. The system of example A or example B, wherein the global shutter image data is at least one of global shutter image data captured by an imager or simulated global shutter image data.

D. The system of any one of example A through example C, wherein the global shutter image data is associated with annotations, and the global-to-rolling shutter image converter is further configured to associate portions of the annotations with portions of the simulated rolling shutter image.

E. The system of any one of example A through example D, wherein the global-to-rolling shutter image converter is further configured to:
associate a plurality of timestamps with a plurality of scan lines of the rolling shutter image;
determine, based at least in part on a first timestamp of the plurality of timestamps and the optical flow field, a first pixel value of a first image of the plurality of global shutter images; and
assign a second pixel of the rolling shutter image a second pixel value, based at least in part on the first pixel value.

F. The system of any one of example A through example E, wherein the global-to-rolling shutter image converter is further configured to:
apply a first tonal mapping to the second pixel value;
determine, based at least in part on a second timestamp, different than the first timestamp, of the plurality of timestamps and the optical flow field, a third pixel value of the first image of the plurality of global shutter images;
assign a fourth pixel of the rolling shutter image a fourth pixel value, based at least in part on the third pixel value; and
apply a second tonal mapping different than the first tonal mapping to the fourth pixel value.

G. An example method comprising:
receiving global shutter image data associated with a plurality of global shutter images;
determining an optical flow field associated with an image and based at least in part on two or more of the plurality of global shutter images, the optical flow field being motion in the image;
receiving a rolling shutter parameter; and
generating a simulated rolling shutter image based at least in part on the optical flow field, the rolling shutter parameter, and the global shutter image data.

H. The method of example G, further comprising generating a high-dynamic range (HDR) image, wherein generating the HDR image comprises generating an HDR sequence comprising at least two frames based at least in part on the optical flow field.

I. The method of example G or example H, wherein the global shutter image data is at least one of global shutter image data captured by an imager or simulated global shutter image data.

J. The method of any one of example G through example I, further comprising:
inputting at least a portion of the simulated rolling shutter image data into a machine learning model to train the machine learning model; and
controlling an autonomous vehicle based at least in part on data received from the machine learning model.

K. The method of any one of example G through example J, further comprising:
associating a plurality of timestamps with a plurality of scan lines of the rolling shutter image;
determining, based at least in part on a first timestamp of the plurality of timestamps and the optical flow field, a first pixel value of a first image of the plurality of global shutter images; and
assigning a second pixel of the rolling shutter image a second pixel value, based at least in part on the first pixel value.

L. The method of any one of example G through example K, the method further comprising:

scaling, as a scaled vector and based at least in part on a timestamp of the plurality of timestamps, a vector of the optical flow field associated with the second pixel; and determining, based on a location of the second pixel and the scaled vector, a location of the first pixel, wherein the second pixel value is based at least in part on an interpolation including the first pixel value.

M. The method of any one of example G through example L, further comprising:

applying a first tonal mapping to the second pixel value;

determining, based at least in part on a second timestamp, different than the first timestamp, of the plurality of timestamps and the optical flow field, a third pixel value of the first image of the plurality of global shutter images;

assigning a fourth pixel of the rolling shutter image a fourth pixel value, based at least in part on the third pixel value; and applying a second tonal mapping different than the first tonal mapping to the fourth pixel value.

N. The method of any one of example G through example M, further comprising associating a timestamp with one or more of the plurality of scan lines.

O. The method of any one of example G through example N, wherein the rolling shutter parameter comprises data indicative of at least one of a frame rate, a scan line density, or scan orientations.

P. The method of any one of example G through example O, wherein the global shutter image data comprises ground truth, and the method further comprises:

associating portions of the ground truth with portions of the simulated rolling shutter image; and inputting at least a portion of the simulated rolling shutter image comprising the ground truth into a machine learning model to train the machine learning model.

Q. The method of any one of example G through example P, wherein the global shutter image data comprises annotations, and the method further comprises adding at least one of the annotations to the simulated rolling shutter image data.

R. One or more example non-transitory computer-readable media storing instructions executable by one or more processors, wherein the instructions, when executed, cause the one or more processors to perform operations comprising:

receiving global shutter image data associated with a plurality of global shutter images;

determining an optical flow field associated with a first image of the plurality of global shutter images based at least in part on two or more of the plurality of global shutter images;

receiving a set of parameters for a simulated rolling shutter imager, the set of parameters comprising a scan rate; and generating, based at least in part on the scan rate, the optical flow field, and the first image, a rolling shutter image.

S. The one or more non-transitory computer-readable media of example R, wherein the operations further comprise one or more of:

generating a high-dynamic range (HDR) image based at least in part on the optical flow field and the first image;

associating a timestamp with one or more of sequential scan lines of the simulated rolling shutter image data; or adding annotation data associated with the first image to the simulated rolling shutter image.

T. The one or more non-transitory computer-readable media of example R or example S, wherein the operations further comprise inputting at least a portion of the simulated rolling shutter image data into a machine learning model to train the machine learning model.

What is claimed is:

1. A system for converting image data into simulated image data, the system comprising:

an image converter configured to:

receive image data associated with images of a first type, wherein the images are rolling shutter images;

determine an optical flow field based at least in part on two or more of the images, the optical flow field representing motion;

determine, based at least in part on a first timestamp associated with a scan line of a rolling shutter image and the optical flow field, a first pixel value of the rolling shutter image;

assign a second pixel of the rolling shutter image a second pixel value, based at least in part on the first pixel value; and generate simulated image data associated with images of a second type different from the first type based at least in part on the optical flow field, one or more image parameters, and the second pixel value associated with the image data.

2. The system of claim 1, wherein the image converter is further configured to generate a high-dynamic range (HDR) image, wherein generating the HDR image comprises generating an HDR sequence comprising two or more image frames based at least in part on the optical flow field.

3. The system of claim 1, wherein the simulated image data is simulated global shutter image data.

4. The system of claim 1, wherein the image data is associated with annotations, and the image converter is further configured to associate an individual annotation of the annotations with a portion of the simulated image data.

5. The system of claim 1, wherein the image converter is further configured to:

apply a first tonal mapping to the second pixel value;

determine, based at least in part on a second timestamp different than the first timestamp and the optical flow field, a third pixel value of the rolling shutter image;

assign a fourth pixel of the rolling shutter image a fourth pixel value, based at least in part on the third pixel value; and apply a second tonal mapping different than the first tonal mapping to the fourth pixel value.

6. A method comprising:

receiving image data associated with images of a first type, wherein the images are rolling shutter images;

determining an optical flow field based at least in part on two or more of the images, the optical flow field representing motion;

determining, based at least in part on a first timestamp associated with a scanline of a rolling shutter image and the optical flow field, a first pixel value of a first pixel of the rolling shutter image;

assigning a second pixel of the rolling shutter image a second pixel value, based at least in part on the first pixel value; and generating simulated image data associated with images of a second type different from the first type based at least in part on the optical flow field, a shutter parameter, and the second pixel value associated with the image data.

7. The method of claim 6, further comprising generating a high-dynamic range (HDR) image, wherein generating the HDR image comprises generating an HDR sequence comprising at least two frames based at least in part on the optical flow field.

8. The method of claim 6, wherein the simulated image data is simulated global shutter image data.

9. The method of claim 6, further comprising:
inputting at least a portion of the simulated image data into a machine learning model; and
controlling an autonomous vehicle based at least in part on data received from the machine learning model.

10. The method of claim 6, the method further comprising:
scaling, as a scaled vector and based at least in part on a second timestamp, a vector of the optical flow field associated with the second pixel; and
determining, based on a location of the second pixel and the scaled vector, a location of the first pixel,
wherein the second pixel value is based at least in part on an interpolation including the first pixel value.

11. The method of claim 6, further comprising:
applying a first tonal mapping to the second pixel value;
determining, based at least in part on a second timestamp different than the first timestamp and the optical flow field, a third pixel value of the rolling shutter image;
assigning a fourth pixel of the rolling shutter image a fourth pixel value, based at least in part on the third pixel value; and
applying a second tonal mapping different than the first tonal mapping to the fourth pixel value.

12. The method of claim 6, wherein the images are rolling shutter images and further comprising associating a timestamp with a scan line of a rolling shutter image.

13. The method of claim 6, wherein the shutter parameter comprises data indicative of at least one of a frame rate, a scan line density, or a scan orientation.

14. The method of claim 6, wherein the image data comprises ground truth, and the method further comprises:
associating a portion of the ground truth with a portion of the simulated image data; and
inputting the portion of the simulated image data comprising the ground truth into a machine learning model to train the machine learning model.

15. The method of claim 6, wherein the image data comprises annotations, and the method further comprises adding at least one of the annotations to the simulated image data.

16. One or more non-transitory computer-readable media storing instructions executable by one or more processors, wherein the instructions, when executed, cause the one or more processors to perform operations comprising:
receiving image data associated with images of a first type, wherein the images are rolling shutter images;
determining an optical flow field based at least in part on two or more of the images, the optical flow field representing motion;
determining, based at least in part on a first timestamp associated with a scanline of a rolling shutter image and the optical flow field, a first pixel value of the rolling shutter image;
assigning a second pixel of the rolling shutter image a second pixel value, based at least in part on the first pixel value; and
outputting simulated image data associated with images of a second type different from the first type based at least in part on the optical flow field, a shutter parameter, and the second pixel value associated with the image data.

17. The one or more non-transitory computer-readable media of claim 16, wherein the operations further comprise one or more of:
generating a high-dynamic range (HDR) image based at least in part on the optical flow field and the image data;
associating a timestamp with one or more scan lines of the simulated image data; or
adding annotation data associated with the image data to the simulated image data.

18. The one or more non-transitory computer-readable media of claim 16, wherein the operations further comprise inputting at least a portion of the simulated image data into a machine learning model to train the machine learning model.

19. The one or more non-transitory computer-readable media of claim 16, wherein the image data is associated with annotations, and the operations further comprising associating an individual annotation of the annotations with a portion of the simulated image data.

20. The one or more non-transitory computer-readable media of claim 16, wherein the simulated image data is simulated global shutter image data.

* * * * *